(12) United States Patent
Witham

(10) Patent No.: US 8,315,509 B2
(45) Date of Patent: Nov. 20, 2012

(54) VIDEO PLAYER FOR DIGITAL VIDEO SERVER

(75) Inventor: Philip James Witham, Portland, OR (US)

(73) Assignee: Thomson Licensing, Boulogne-Billancourt (FR)

( * ) Notice: Subject to any disclaimer, the term of this patent is extended or adjusted under 35 U.S.C. 154(b) by 1148 days.

(21) Appl. No.: 11/883,147

(22) PCT Filed: Jan. 27, 2005

(86) PCT No.: PCT/US2005/003041
§ 371 (c)(1),
(2), (4) Date: Jul. 26, 2007

(87) PCT Pub. No.: WO2006/080925
PCT Pub. Date: Aug. 3, 2006

(65) Prior Publication Data
US 2008/0247728 A1    Oct. 9, 2008

(51) Int. Cl.
*H04N 5/783* (2006.01)
*H04N 9/80* (2006.01)
*H04N 5/93* (2006.01)
*H04N 5/917* (2006.01)

(52) U.S. Cl. ........ 386/343; 386/248; 386/344; 386/353; 386/356

(58) Field of Classification Search ............... 386/248, 386/343–352, 354, 356
See application file for complete search history.

(56) References Cited

U.S. PATENT DOCUMENTS

| | | | |
|---|---|---|---|
| 5,724,537 A * | 3/1998 | Jones | 711/1 |
| 5,982,431 A | 11/1999 | Chung | |
| 6,012,137 A | 1/2000 | Bublil et al. | |
| 6,154,603 A | 11/2000 | Willis et al. | |
| 6,243,140 B1 | 6/2001 | Suzuki | |
| 6,249,551 B1 | 6/2001 | Yamaguchi | |
| 6,493,043 B1 | 12/2002 | Bollmann et al. | |
| 6,529,682 B1 * | 3/2003 | Okada et al. | 386/241 |
| 6,542,693 B2 | 4/2003 | Boyce | |
| 2003/0002584 A1 | 1/2003 | Campisano et al. | |

(Continued)

FOREIGN PATENT DOCUMENTS

EP    0 905 962 A2 *  3/1999

(Continued)

OTHER PUBLICATIONS

Cacopardi et al.: "A DSP based MPEG-2 Video Decoder for HDTV or Multichannel SDTV", Proceeding of 2002 IEEE Workshop on Multimedia Signal Processing, pp. 134-137, Published Piscataway, NJ, USA, 2002.

(Continued)

*Primary Examiner* — Thai Tran
*Assistant Examiner* — Hung Dang
(74) *Attorney, Agent, or Firm* — Robert D. Shedd; Robert B. Levy

(57) ABSTRACT

A system for playing digital video at varying playback speeds can include a fetcher module configured to retrieve encoded pictures from a data store and an allocator module configured to selectively delete encoded pictures from an input cache. The system further can include a decoder module and an output cache module. The decoder module can decode pictures received from the input cache. The output cache module can store a plurality of decoded pictures and provide selected ones of the pictures as output. Pictures are processed within each of the modules according to a priority corresponding to each picture.

14 Claims, 2 Drawing Sheets

U.S. PATENT DOCUMENTS

| | | |
|---|---|---|
| 2003/0123555 A1 | 7/2003 | Kim |
| 2003/0156650 A1 | 8/2003 | Campisano et al. |
| 2004/0022313 A1 | 2/2004 | Kim |
| 2004/0057624 A1 | 3/2004 | Wells |
| 2004/0076236 A1* | 4/2004 | Duruoz et al. ........... 375/240.25 |
| 2005/0002645 A1* | 1/2005 | Furukawa et al. ............. 386/68 |

FOREIGN PATENT DOCUMENTS

| | | |
|---|---|---|
| JP | 9186966 | 7/1997 |
| JP | 11-313283 | 11/1999 |
| JP | 2000032400 | 1/2000 |
| JP | 2000341696 | 12/2000 |
| JP | 2003046960 | 2/2003 |
| JP | 2003-339019 | 11/2003 |
| JP | 2004153630 | 5/2004 |
| JP | 2004-350152 | 12/2004 |
| WO | WO03053066 | 6/2003 |

OTHER PUBLICATIONS

Golston et al.: "Optimized Video Decoder Architecture for TMS320C64x DSP Generation", Proceedings of the SPIE—The International Society for Optical Engineering, vol. 5022, pp. 719-726, 2003.

Lee et al.: "A Low-complexity Frame Memory Compression Algorithm and its Implementation for MPEG-2 Video Decoder", Proceedings of Second IEEE Asia Pacific Conference on ASICs. AP-ASIC 2000, pp. 103-106, Published: Piscataway, NJ, USA, 2000.

International Search Report, dated Oct. 10, 2005.

* cited by examiner

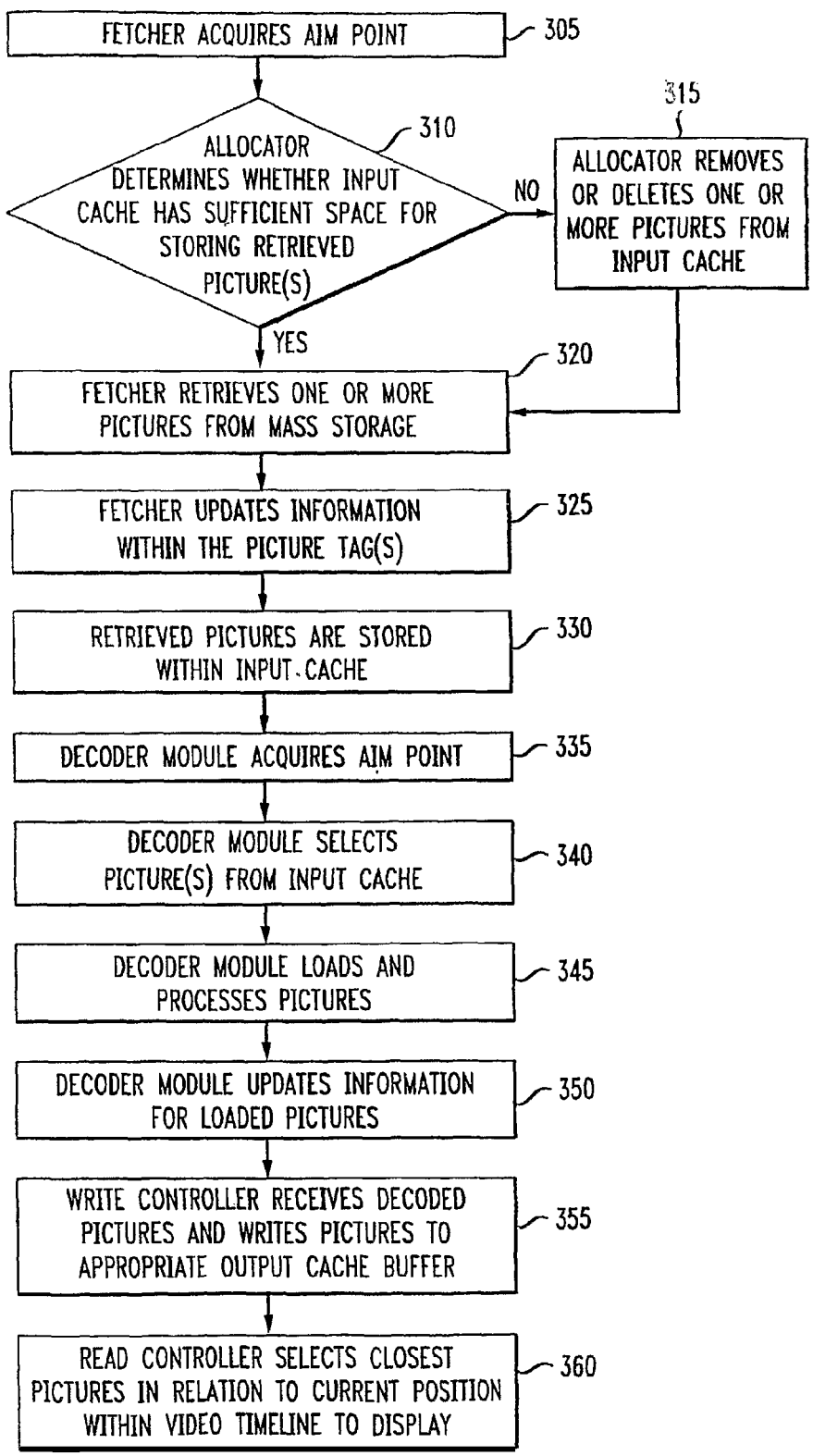

VIDEO PLAYER FOR DIGITAL VIDEO SERVER

This application claims the benefit, under 35 U.S.C. §365 of International ApplicationPCT/US2005/003041 filed Jan. 27, 2005, which was published in accordance with PCT Article 21(2) on Aug. 3, 2006 in English.

FIELD OF THE INVENTION

The present invention generally relates to a video playback system for use with digital video servers and other video players.

BACKGROUND OF THE INVENTION

Conventional digital video systems have traditionally lacked enough memory to buffer a plurality of frames of uncompressed video at the output of a digital video decoder. This lack of output buffer capacity has resulted in designs in which functions such as data retrieval, decoding pictures such as fields or frames, and displaying frames all are tightly integrated and scheduled to produce suitable video playback quality. Thus, the primary driver in video playback system design has been the necessity of having the correct picture, or pictures, appear at the decoder outputs in real time and in the correct display order.

Digital video playback at regular playback speed, referred to as 1×, can be accomplished with relative ease in modern video playback systems. Variable speed playback such as reverse, slow-motion, fast forward, fast forward and reverse (shuttle), and frame-by-frame movement (jog), however, are more difficult to achieve. Further complicating matters is need for a video playback system to respond to real-time user manipulation of jog and/or shuttle controls during video playback. A digital video system not only must provide smooth playback within each of the aforementioned playback modes, but also must smoothly transition from one mode to another responsive to user requests, such as those received via a jog or shuttle control of the video playback system.

For example, one method of producing a slow motion effect is through field interpolation at the output of the decoder performed in synchronism with decoding. This technique can be difficult to implement in a manner that is responsive to a jog or shuttle control. Another case where responsiveness to jog and shuttle controls can be problematic pertains to effects used in dual track movies. Dual track movies typically include effects such as fades or transitions between two or more video tracks. Producing such effects while playing back video in a manner that is responsive to jog and/or shuttle controls can be difficult.

If the digital video system is to play long-Group of Picture (GOP) formatted video, it becomes even more difficult to provide good performance. Long GOP refers to a video compression format, such as MPEG-2 Long GOP, or any other video decoding process, which uses forward and/or backward motion prediction between frames. A common failure of many such video decoders is that playback pauses and repeats frames while the system reacts to a disturbance such as a change in shuttle speed.

Another example is the playing of long-GOP formatted video in reverse. Playing long-GOP in reverse is especially troublesome because conventional decoders only decode some of the frames. These frames are repeated at the output as needed to fill in. This partial decoding arises from the need to decode I and P ("anchor") frames before decoding their dependant P and B frames. Further, most decoder chips only decode forward within a GOP, resulting in visible artifacts such as jumpy or jerky playback and pauses when changing playback speeds.

While this listing is not intended to be comprehensive, it is illustrative of the complexities involved with providing smooth and responsive video playback in various playback modes. When editing video, however, it is especially important to have fast, smooth, accurate response to the shuttle and jog controls. This can significantly affect the amount of time required for a video editor to locate a cue point in a movie clip, for example, which is an oft repeated video editing task. The problems described above illustrate why long-GOP traditionally has been avoided in video editing systems.

Past designs have read pictures from disk in advance of decoding. The pictures are buffered in memory for some period of time in advance of the pictures being decoded and displayed. While this provides some degree of independence between fetching and decoding, when playback velocity is changed, the system needs to fetch different pictures from disk. The different pictures must be stored in free memory. The digital video system must determine which pictures to free, or remove, from the input buffer. The operation of the video playback system is generally front-end driven and real-time scheduled.

Accordingly, a need exists for a digital video playback system that provides increased control over which pictures are loaded, processed, and provided throughout the video decoding process.

SUMMARY OF THE INVENTION

The present invention relates to a system for processing digital video. One aspect of the present invention is a system for playing digital video at varying playback speeds. The system can include a fetcher module, an allocator module, a decoder module, and an output cache module. The fetcher module can be configured to retrieve encoded pictures from a data store. The allocator module can be configured to add retrieved encoded pictures to an input cache and to selectively delete encoded pictures from an input cache. The decoder module can decode pictures received from the input cache. The output cache module can store a plurality of decoded pictures and provide selected ones of the pictures as output. Pictures can be processed within each of the aforementioned modules according to a priority corresponding to each picture.

In one embodiment, the priority can indicate a distance between a position of a picture within a video timeline and an aim point. The aim point can specify a target location within the video timeline that is dependent upon at least one of video playback position, velocity, and/or acceleration. Each of the modules of the video playback system can utilize a different aim point within the video timeline. The aim point can be determined by multiplying the video playback velocity and video playback acceleration by at least one tuning coefficient and summing the results with a current position in the video timeline.

The fetcher can retrieve encoded pictures having a highest priority from the data store. The system also can include an upper control layer configured to limit the video playback acceleration to a predetermined maximum acceleration. An input cache for storing encoded pictures retrieved from the data store prior to decoding by the decoder also can be included. In one aspect, the allocator can be operable only when the input cache does not have available space for storing newly retrieved pictures from the data store.

In one embodiment, the decoder module can include at least two decoders. In another embodiment, the decoder module can include at least one decoder and at least one picture First-In-First-Out tag (FIFO). Each decoder can correspond to a picture FIFO. The decoder module can evaluate encoded pictures within the input cache and select at least one picture from the input cache for decoding. The selected picture(s) has a highest priority based upon an aim point corresponding to the decoder module.

The output cache module can include a write controller configured to overwrite lowest priority pictures with higher priority pictures. The output cache module can include a plurality of output cache buffers. Accordingly, the write controller can select one of the output cache buffers from the plurality of output cache buffers prior to writing each decoded picture.

The output cache module further can include a read controller configured to select at least one field from the output cache buffers that is closest to a current position within the video timeline for display during each field time. A read controller FIFO also can be included in the output cache module. The read controller FIFO can delay position commands intended for the read controller by an adjustable amount.

BRIEF DESCRIPTION OF THE DRAWINGS

Preferred embodiments of the present invention will be described below in more detail, with reference to the accompanying drawings.

FIG. 2 is a flow chart illustrating a method of playing back digital video in accordance with another embodiment of the present invention.

DETAILED DESCRIPTION OF THE INVENTION

Figure 1:
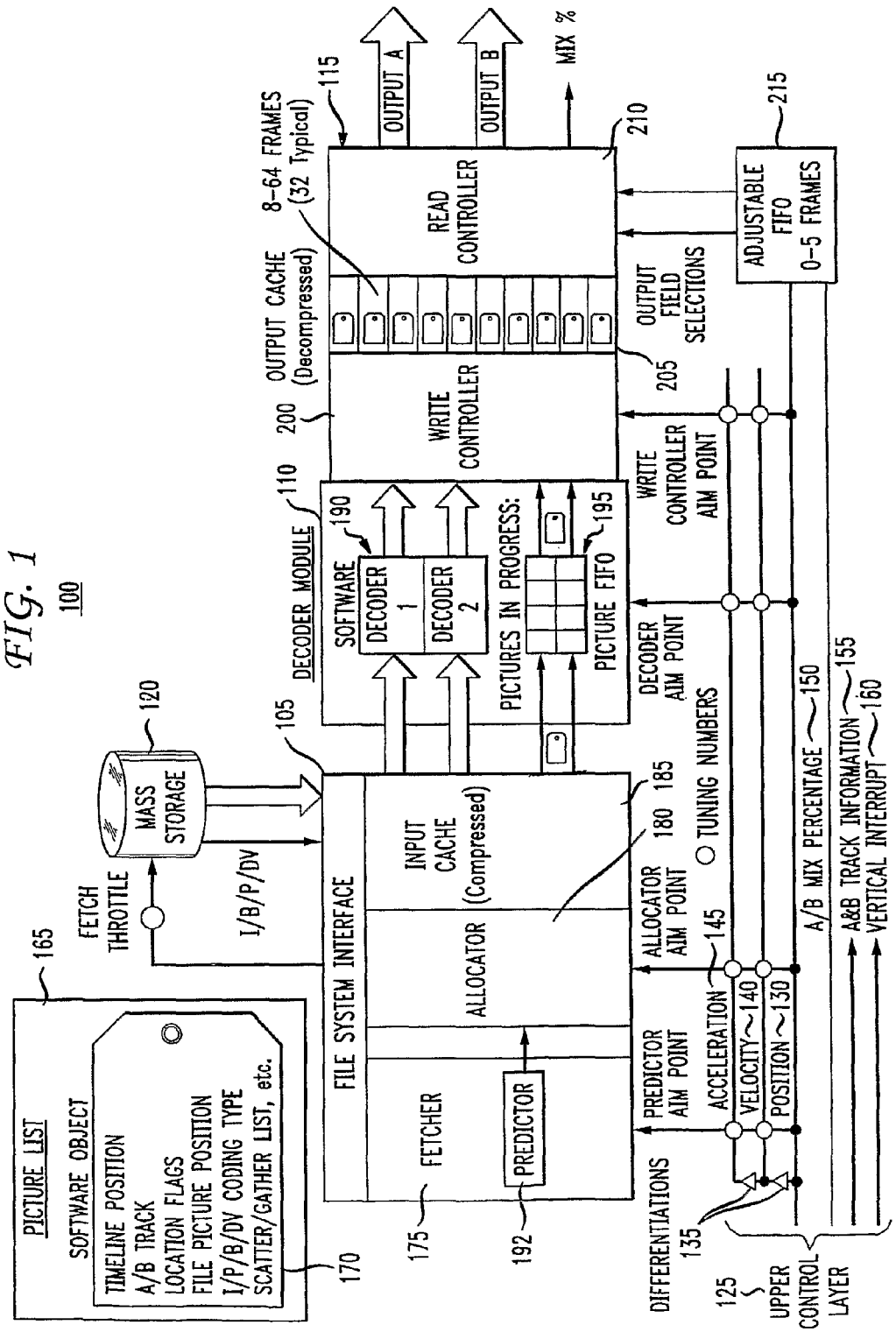
FIG. 1 is a schematic diagram illustrating a digital video playback system in accordance with one embodiment of the present invention.

The present invention provides a digital video playback system for use in digital video servers and other video players. Rather than rely upon a front-end driven, real-time scheduled architecture, the present invention allows each module within the digital video playback system to schedule, or select, which pictures will be processed or worked upon. In accordance with the inventive arrangements disclosed herein, each module of the video playback system can determine a picture processing priority at any given time according a priority scheme.

As used herein, a timeline refers to a chronological series of pictures, or movie that the video playback system is playing. The movie can include one or more separate video files and/or pictures that can be combined into a larger complex movie. The video files and/or pictures, therefore, must be played in a particular order to be played. A picture, as used herein, can refer to a field and/or a frame of video.

FIG. 1 is a schematic diagram illustrating a video playback system 100 in accordance with one embodiment of the present invention. The video playback system 100 can decode and play digital video content. As shown, the video playback system 100 includes a file system interface module 105, a fetcher module 175, an allocator module 180, an input cache 185, a decoder module 110, and an output cache module 115. The aforementioned modules can be implemented using integrated circuits (IC's) such as field programmable gate arrays (FPGA's), memories, controllers, processors, discrete components, suitable software or computer programs executing within a host processor or controller, or any combination thereof.

The video playback system 100 further can include a mass storage device 120. The mass storage device 120 can be a magnetic hard disk drive, an optical disk, a memory, or the like. The modules 105-115, 175-185, and the mass storage 120 can be interconnected via a communications bus or other suitable circuitry as shown. In any case, fetcher module 175, the allocator module 180, the decoder module 110, and the output cache module 115 each can operate independently in selecting particular pictures to be processed based upon a priority scheme. In one embodiment, the priority scheme can be based upon aim points, which will be described herein in further detail.

An upper control layer 125 also is included. The upper control layer 125 can be implemented as a centralized processor and/or signaling system. As such, the upper control layer 125 initializes each of the modules and manages the overall starting and stopping of digital video playback, for example by providing timing information to each of the respective modules of the video playback system 100. Accordingly, the upper control layer 125 can provide position information 130 pertaining to each picture within the digital video stream. From position information 130, differentiators 135 can determine velocity information 140 and acceleration information 145 pertaining to the digital video stream. Velocity information 140 can be determined by subtracting a position of a previous picture from a position of a current picture. Acceleration information 145 can be determined by subtracting the velocity of the previous picture from the velocity of the current picture.

In one embodiment, the upper control layer 125 can provide each of the fetcher module 175, the allocator module 180, the decoder module 110, and the output cache module 115 with position 130, velocity 140, and/or acceleration 145 information. Each individual module can compute its own aim points. In another embodiment, each module can be provided with an aim point from the upper control layer 125. In any case, the aim point used by each module at any point in time can differ from those used by the other modules. Such information can vary from one module to the next as each module will be processing different pictures in the digital video timeline.

The velocity and acceleration information determined for each module can be multiplied by one or more tuning coefficients. Velocity and acceleration can be multiplied by different tuning coefficients. Moreover, different tuning coefficients can be used for each module to account for the location of each respective module within the video processing chain. Once the velocity and acceleration information are multiplied by the predetermined tuning coefficients, the results can be added to a current position within the digital video timeline, which can vary from one module to the next. The result is an aim point that precedes the current position within the video timeline in the direction of movement. Thus, at a given point in real-time, an aim point for the fetcher module 175, for example, would be farther ahead along the digital video timeline than an aim point for the decoder module 110.

The A & B track information 155 indicates whether there is one or two tracks of video at given positions within the timeline. The A & B track information 155 further can indicate which video files correspond to these tracks and the mix percentage between the two tracks reflected by the mix percentage information 150.

In the case where two or more tracks of video exist, the mix percentage information 150 indicates the percentage of each track that is to be played at the output of the video playback system 100, or to drive a "mix effect" such as a particular type of wipe effect. Such information indicates how transitions from one track to another are processed. The upper control layer 125 also provides a vertical interrupt 155, which causes the fetcher module 175, the allocator module 180, the decoder module 110, and the output cache module 115 to execute. Each module can execute one time per interrupt to process at least one picture.

Another function of the upper control layer 125 is to create and manage one or more picture lists 165. The picture list 165 is a listing of the pictures that are currently stored in the input or output cache or in progress in some part of the system. Each picture can be associated with a software object 170 within the picture list. The software object 170, which can be referred to as a tag, specifies information which can include, but is not limited to, the position of the picture within the digital video timeline, the track to which the picture corresponds, the current location of the picture within the video playback system 100, the file picture position, the coding type (i.e. I, P, B, DV, etc.), scatter/gather lists, and the like. Though one tag is shown, each picture can be associated with its own tag.

In one embodiment, a single picture list 165 can be used throughout the video playback system 100. This picture list 165 can be stored in a memory that is accessible by each module of the video playback system 100. In another embodiment, however, each module can include and/or maintain its own picture list.

The upper control layer 125, or another control processor, can enforce an acceleration limit with respect to the system 100 as a whole. Such a limit provides smoother video playback making it easier for a user to comprehend where in the video timeline the user is located. For example a limit of ±5×/second, or 5 frames per second squared, can be enforced. This is equivalent to preventing the velocity from increasing or decreasing more than 5 pictures per picture. Such a function can be implemented as a software feature, for example, within the context of reading a shuttle speed control knob.

The file system interface 105 serves as an intermediary to the mass storage 120. As such, the file system interface 105 can be configured to read data of the particular format stored in the mass storage 120 and further to communicate such data to the fetcher module 175. The fetcher module 175 is configured to retrieve encoded pictures stored within the mass storage device 120 through the file system interface 105. The fetcher module 175 reads the mass storage device 120 and selects the highest priority picture(s) that are not already loaded within the input cache 185. The priority of a picture refers to the proximity of the picture with respect to the aim point in the digital video timeline. Each module within the video playback system 100 can determine priority information for one or more pictures as may be required during the decoding process. As each picture occupies a particular position within the digital video timeline, the distance of that picture from the aim point for a particular module, in this case the fetcher module 175, can be determined. The smaller the distance between the picture and the aim point, the higher the priority of the picture.

Within the fetcher module 175, a predictor 192 executes a prediction algorithm. The algorithm is dependent upon the current playback velocity information 140 and aim point as determined from the upper control layer 125. Accordingly, the predictor 192 selects an ideal set of pictures, i.e. a high priority set of pictures that is retrieved from the mass storage 120.

The allocator module 180 frees, or reuses, memory of the input cache 185 that is occupied by lowest priority picture(s) in cases where the fetcher module 175 needs to retrieve one or more higher priority pictures. The allocator module 180, for example, can operate when the input cache 185 does not have sufficient storage space for newly retrieved pictures. The allocator module 180 can delete pictures from the input cache 185, overwrite pictures, or the like. Any technique for freeing memory from the input cache 185 can be used. After pictures are retrieved by the fetcher module 175 from the mass storage 120, the allocator module 180 places those pictures in the input cache 185. The input cache 180 stores the encoded, or compressed, pictures prior to decoding by the decoder module 110.

The decoder module 110 can include a hardware decoder 190 and a picture tag FIFO 195. In one embodiment, the hardware decoder 190 can include operational software allowing the hardware decoder 190 to execute general video decoding functions. For example, the software can instruct the decoder 190 to start decoding, stop decoding, and perform a reset. Notwithstanding, however, the decoder 190 also can be implemented as a software-based decoder executing within a processor rather than a dedicated hardware-based decoder.

In any case, the software working in conjunction with the decoder 190 can configure or reconfigure the decoder 190 for decoding particular video formats and/or media types. The software also can feed the decoder 190 with blank pictures when no video data or pictures are available for decoding. Blank pictures refer to pictures that are marked for deletion at the output cache module 115, and as such, are not to be played. Such pictures can be viewed as filler pictures intended to keep the decoder 190 occupied. The picture tag FIFO 195 stores information such as tags representing the pictures in progress in the actual decoder 190. The picture tag FIFO 195 correctly identifies pictures at the output of the decoder 190.

In one embodiment, and as shown in FIG. 1, the decoder 190 can include two decoders or two channels (hereafter collectively "decoder") to accommodate dual video streams. As such, while both decoders can decode the same type of digital video, each decoder also can be configured to decode a different variety of digital video. It should be appreciated, however, that more than two decoders could be included. Each decoder can be associated with its own picture tag FIFO to identify the output from that decoder. The present invention, however, can be applied to single-stream and/or multi-stream decoders, including decoders that operate faster than real-time.

The decoder 190 processes only pictures that have been read from the mass storage 120 and which are stored within the input cache 185. The decoder 110 generally selects the two highest priority pictures which are located in input cache 185, and which are not in the output cache module 115 or being decoded within the decoder 190. Where more than one decoder is used, i.e. to process more than one digital video stream, each picture is directed to a particular decoder to accommodate constraints relating to video data formatting such as whether the video stream is an MPEG stream, Digital Video (DV), and/or GOP formatted. Accordingly, the decoder 110 is programmed to make GOP-aware decisions to feed needed anchor frames before dependant pictures are processed for long-GOP formats.

With respect to Long-Group of Picture (GOP) formats, the fetcher module 175 and the decoder module 110 can make GOP aware decisions as needed. Such a mechanism can ensure that anchor frames such as MPEG I and P coded pictures are retrieved prior to dependent pictures such as MPEG P and B coded pictures.

The output cache module 115 can include a write controller 200, a plurality of output cache buffers 205, a read controller 210, as well as a read controller FIFO 215. The write controller 200 chooses which, if any, of the plurality of output cache buffers to which decoder 190 outputs will write decoded pictures. The write controller 200 discards, i.e. overwrites, the lowest priority picture(s) with higher priority picture(s). The output cache buffer 205 is a memory for temporarily storing uncompressed pictures written by the decoder 190. The number of output cache buffers 205 can vary according to design preference and need not be linked or dependent upon the number of video streams being processed.

The read controller 210 analyzes the contents of the output cache buffers 205 and selects the closest pictures as compared with the current position within the video timeline. For example, the read controller 210 can select two fields to be displayed on the A and B outputs, for each field time.

The read controller FIFO 215 delays position commands from the upper control layer 125 to the read controller 210. The delay function can provide the system 100 with more time to supply needed pictures as video output. The read controller FIFO 215 can be adjusted to provide varying amounts of delay thereby allowing the video playback system 100 to be tuned for better performance. In one embodiment, however, the read controller FIFO 215 can be set to zero delay, or excluded from the system 100 altogether.

While the read controller FIFO 215 has been described as part of the output cache module 115, in another embodiment, the read controller FIFO 215 can be incorporated into the upper control layer 125. Accordingly, the present invention is not so limited.

FIG. 2 is a flow chart illustrating a method 300 of playing back digital video in accordance with another embodiment of the present invention. The method 300 can begin in step 305 where the fetcher module 175 acquires an aim point indicating a current position within the video timeline. As noted, the aim point is corrected for velocity and acceleration as interpreted from user controls used to vary or change the position within the video timeline.

In step 310, the allocator module 180 determines whether the input cache has sufficient space for storing the retrieved pictures. If so, the method can proceed to step 320. If not, in step 315 the allocator module 180 removes, overwrites, or deletes one or more pictures from the input cache to leave sufficient space for storing the requested and fetched pictures. The allocator module 180 optionally removes pictures having a lower priority than those that were retrieved. The allocator module 180 may, however, determine that previously stored pictures have higher priority, and refuse to provide space for a new picture, thus temporarily halting fetching at that time. To increase the amount of space available within the input cache, the pictures stored therein typically are compressed during encoding. That is, the pictures stored within the input cache are still encoded, thereby saving memory.

In one embodiment, the allocator module 180 can remove the picture(s) that have the lowest priority of all the pictures stored within the input cache. The allocator module 180 also can acquire an aim point, which can be used to evaluate which picture(s) to remove from the input cache.

Using the aim point and the predictor 192, the fetcher module 175 retrieves one or more pictures from the mass storage in step 320. The predictor 192 can calculate the priority information for the pictures allowing the fetcher module 175 to select and retrieve the appropriate pictures. Pictures that are the highest priority, i.e. those picture(s) that are the closest to the aim point based upon the position of the pictures within the video timeline can be selected. The fetcher module 175 can access the picture list to determine which pictures have already been retrieved from the mass storage and which pictures are located within the input cache. As noted, the fetcher module 175 can make GOP-aware decisions. Accordingly, if a dependent picture is closer to the aim point than the corresponding anchor picture, the fetcher module 175 can select the anchor picture prior to the dependent picture in order to properly decode the pictures.

In step 325, the fetcher module 175 can update the information specified within the tag(s) for the retrieved picture(s). That is, the fetcher module 175 can set location flags that indicate that the retrieved pictures are now, or are soon to be, located within the input cache. In step 330, the retrieved pictures are stored within the input cache.

In step 335, the decoder module 110 acquires an aim point. In step 340, the decoder module 110 selects one or more pictures from the input cache. The pictures selected from the input cache can be the pictures having the highest priority as calculated by the decoder module 110 using the aim point and the location of the picture within the video timeline. In step 345, the selected pictures are loaded into, and processed by, the decoder module 110. In step 350, the decoder module 110 updates the tags corresponding to the loaded pictures to indicate that the pictures are presently in the decoder. Pictures available from the decoder output(s) can be indicated by the picture tag FIFO('s).

In step 355, the decoder 190 can write the decoded picture to the output cache buffer chosen by the write controller 200. As noted, the write controller 200 selects which output cache buffer the decoded picture is to be written. In the case where more than one stream of video can be decoded, decoded pictures from the first stream are stored within the output cache buffer selected for that frame or picture. Decoded pictures corresponding to the second stream are stored within the output cache buffer selected for that frame, and so on. Thus, the pictures are stored within the output cache buffer in a decoded, or uncompressed, format.

The write controller 200 can overwrite and/or otherwise discard lower priority pictures to make room for higher priority pictures. To make this determination, the write controller 200 can acquire an aim point and compare the aim point with the position of the picture within the video timeline. Accordingly, the write controller 200 can calculate priority information to be used in writing pictures to the output buffer cache. The write controller 200 further can decide not to overwrite any stored picture, and instead discard the output of any particular decoder stream.

In step 360, the read controller 200 selects the closest pictures, or fields, in relation to the current position within the video timeline for display. Thus, if two video streams are being decoded by the read controller 200, the read controller 200 can select four fields, two for each video stream. The selected pictures are provided over outputs A and B in the case of a two-stream decoder. The mix percentage signal indicates the percentage of each data stream to be played or rendered.

With respect to interlaced video output format, the source buffer selected for video output in the first video field time can be different from the source buffer used during the second output field time. This can be particularly useful when playing video at high speed in combination with the dual-stream decoder architecture illustrated herein. In that case, 60 full frames can be decoded per second from a single track, and the read controller 200 can select one field out of each of these frames. This results in playback that is roughly twice as smooth as is possible with conventional designs.

The inventive arrangements disclosed herein utilize a system where priorities are used to drive picture selection and decoding rather than a front-end driven, real-time scheduled decoding. The priorities can be determined according to the distance of a picture within the video timeline from an aim point, which is a current position within a video timeline that is adjusted for velocity and acceleration. Also utilized is a back-end selection process in conjunction with an uncompressed cache. Accordingly, the video playback architecture relieves the decoder from having to work strictly in real-time. This allows, for instance, forward decoding in GOP, as required by the decode hardware, while playing in reverse. Further, the latency of the mass storage and decode mechanism, whether hardware or software-based, can be hidden thereby allowing fast response to user controls. The present invention takes advantage of both decoders of typical dual decoder hardware to achieve improved decoding with respect to single track high-speed shuttle playback.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

Aspects of the present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

The invention claimed is:

1. A system for playing digital video at variable playback speeds comprising:
 a fetcher module configured to retrieve encoded pictures from a data store;
 an allocator module configured to selectively add retrieved encoded pictures to, and delete encoded pictures from, an input cache;
 a decoder module configured to decode pictures received from said input cache; and
 an output cache module configured to store a plurality of decoded pictures and provide selected ones of the pictures as output;
 wherein pictures are processed within each of said modules according to a priority corresponding to each picture, wherein said priority indicates a distance between a position of a picture within a video timeline and an aim point that specifies a target location within the video timeline that is dependent upon the video playback position adjusted for velocity, and acceleration occurring during variable speed playback of the digital video.

2. The system of claim 1, wherein each said module utilizes a different aim point within the video timeline.

3. The system of claim 1, wherein the aim point is determined by multiplying the video playback velocity and video playback acceleration by at least one tuning coefficient and summing the results with a current position in the video timeline.

4. The system of claim 1, wherein said fetcher retrieves encoded pictures having a highest priority from the data store.

5. The system of claim 1, further comprising an upper control layer configured to limit the video playback acceleration to a predetermined maximum acceleration.

6. The system of claim 1, further comprising an input cache for storing encoded pictures retrieved from the data store prior to decoding by said decoder module.

7. The system of claim 6, wherein said allocator is operable only when said input cache does not have available space for storing newly retrieved pictures from the data store.

8. The system of claim 1, wherein said decoder module comprises at least two decoders.

9. The system of claim 1, wherein said decoder module comprises at least one decoder and at least one picture First-In-First-Out tag (FIFO) corresponding to said at least one decoder.

10. The system of claim 1, wherein said decoder module evaluates encoded pictures within said input cache and selects at least one picture from said input cache for decoding, wherein the selected at least one picture has a highest priority based upon an aim point corresponding to said decoder module.

11. The system of claim 1, said output cache module further comprising a write controller configured to overwrite lowest priority pictures with higher priority pictures.

12. The system of claim 11, wherein said output cache module comprises a plurality of output cache buffers, said write controller selecting one of said output cache buffers from said plurality of output cache buffers prior to writing each decoded picture.

13. The system of claim 12, said output cache module further comprising a read controller configured to select at least one field closest to a current position within the video timeline from said plurality of output cache buffers for display during each field time.

14. The system of claim 13, said output cache module further comprising a read controller First-In-First-Out (FIFO) configured to delay position commands intended for said read controller by an adjustable amount.

* * * * *